UNITED STATES PATENT OFFICE.

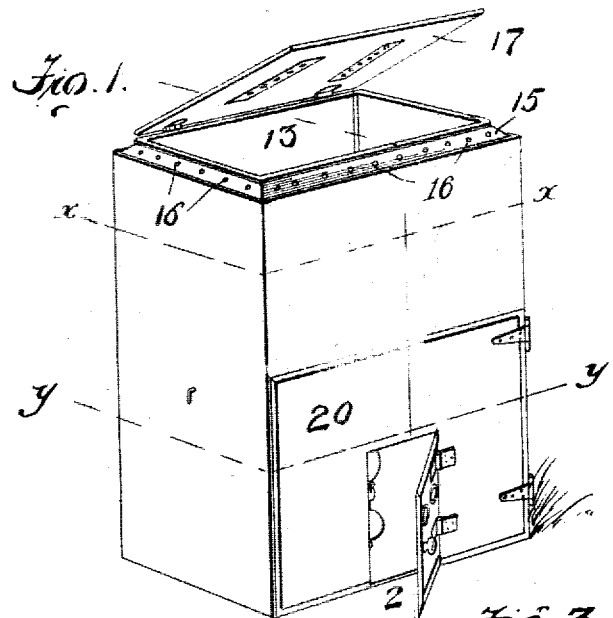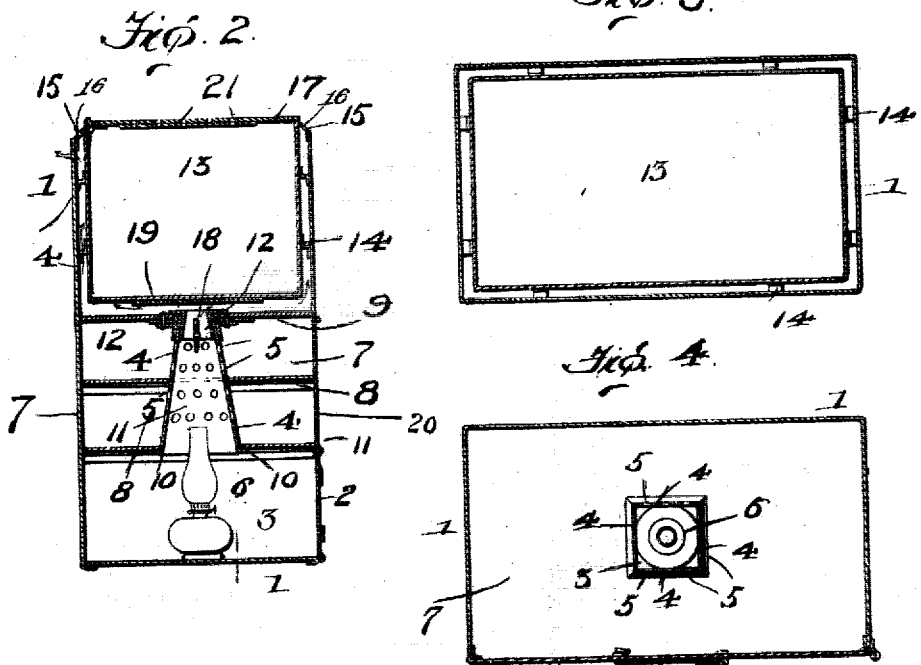

WILLIAM H. HOLLANDER, OF EVANSVILLE, INDIANA.

DOUGH-RAISER.

No. 811,781.  Specification of Letters Patent.  Patented Feb. 6, 1906.

Application filed December 28, 1904. Serial No. 238,570.

*To all whom it may concern:*

Be it known that I, WILLIAM H. HOLLANDER, a citizen of the United States, residing at Evansville, county of Vanderburg, and State of Indiana, have invented certain new and useful Improvements in Dough-Raisers, of which the following is a specification.

My invention relates to dough-raisers; and the object of the invention is to provide a device of this character which will be compact and handy and which will perform the essential functions of such device in a capable and efficient manner.

A further object of the device is the provision of means whereby two compartments may be heated independently or separately at the same time or at different times.

The invention consists in a rectangular casing in which there are two compartments and a combustion-compartment and means for dividing the two compartments, so one can be heated while the other remains idle.

In the drawings which form a part of this application, Figure 1 represents a perspective view of the device with the lid of the dough-trough raised and the door of the combustion-chamber open. Fig. 2 represents a vertical section of the device; Fig. 3, a transverse section on lines $x\ x$ of Fig. 1; and Fig. 4 a transverse section on lines $y\ y$, Fig. 1.

Referring more particularly to the drawings, 1 represents a casing of suitable length, breadth, and depth, which is provided at 2 with a door leading into the combustion-chamber 3. This combustion-chamber 3 communicates with a tubular member 4, having apertures 5 adapted to allow the heat from the lamp 6 to penetrate the compartments 7. These compartments 7 are provided with shelves 8 and a top 9, which separates them from the rest of the structure. The tubular member 4 is slanted inwardly from a point 10 to the top 9 and forms a conical flue 11, which is provided at its upper portion with shields 12, adapted to prevent excessive heat at the point of intersection of the top 9 and the partitions 4.

Spaced from the sides, front, and back of the casing 1 above the top 9 is a dough trough or box 13, which is held from engagement with the sides by strips 14 and raised above the upper edge of the outside casing and connected therewith at the top by means of strips 15, having heat-outlet apertures 16. Secured to these strips and to the outside of the casing by strap-hinges is the lid 17, which covers the dough-trough, but does not overlap the outside casing. This is done so as to prevent return of the escaping heat through the apertures 16, and the dough-trough is raised above the outside casing, so that should the lid lap over the heat will not be prevented from escaping. In the conical heat-flue there is placed a damper 18, which is adapted to close the flue 11 to prevent the heat from coming in contact with the dough-trough 13 and which forces the heat through the apertures 5 into the compartment 7. When the damper is turned so as to allow the heat to pass up around the compartment 11, it strikes with great force against the under side of the dough-box 13, and I therefore provide a shield 19 of any suitable substance. This is secured to the under side of the dough-box and prevents burning of the wood from excessive heat thereon. 20 represents a door which gives access to the compartment 7. In the lid 17 I have shown several apertures 21, which are adapted to give vent to the vapor or air which might arise from the dough or yeast in the dough-box.

It will be clearly understood that I need not use a lamp, but may use any suitable means for heating purposes, such as a gas-jet or charcoal fire or such other means as I might deem best to use.

The operation is as follows: The dough or yeast is placed within the dough box or compartment 13 and the lamp lighted and the damper opened, so as to direct the heat against the bottom of the box. As it strikes against the shield 19 it is deflected and passes up around the sides of the dough-box 13 and out the apertures 16 in the strips 15. At night flour and yeast may be placed in the dough-box 13 in separate compartments or receptacles and the yeast allowed to rise over night. In the morning the flour and yeast are mixed in the same chamber and allowed to sit therein until the dough rises. It is then made into loaves and placed in pans and put into compartments 7 on shelves 8 to rise again, the damper being closed to drive the heat through the apertures 5 into these compartments.

Having thus described my invention, what I claim as new, and desire to secure by Letters Patent, is—

1. In a device of the class described, the combination with a casing and means for heating the interior of said casing, of a dough-box within said casing and separated therefrom, said dough-box being raised above the casing, means connecting the casing to said dough-box at the top, said means provided with outlet-apertures for the heat, and a lid for said dough-box.

2. In a device of the class described, the combination with a casing and means for heating the interior of said casing, of a dough-box within said casing and separated therefrom, said dough-box being raised above the casing, beveled strips separating the casing and the dough-box and connecting them together at the top of said casing and dough-box, said beveled strips provided with heat-outlet apertures, and a top adapted to close the dough-box.

3. In a device of the class described, the combination with a casing, of a combustion-chamber therein, a plurality of compartments therein, one of said compartments being separated from the casing, the other of said compartments being provided with shelves, a flue running through one of said compartments provided with apertures adapted to direct air into the compartment through which it runs, a damper in said flue adapted to change the current of heated air through said flue, a shield protecting the top of the compartment through which the flue runs, and a shield protecting the bottom of the separated compartment.

In testimony whereof I hereunto affix my signature in presence of two witnesses.

WILLIAM H. HOLLANDER.

Witnesses:
F. C. GORE,
C. I. FISHER.